(12) United States Patent
Webb

(10) Patent No.: US 6,760,010 B1
(45) Date of Patent: Jul. 6, 2004

(54) WIRELESS ELECTRONIC LIBRETTO DISPLAY APPARATUS AND METHOD

(75) Inventor: Geoffrey J. H. Webb, Santa Fe, NM (US)

(73) Assignee: Figaro Systems, Inc., Santa Fe, NM (US)

( * ) Notice: Subject to any disclaimer, the term of this patent is extended or adjusted under 35 U.S.C. 154(b) by 0 days.

(21) Appl. No.: 09/526,268

(22) Filed: Mar. 15, 2000

(51) Int. Cl.[7] .............................................. G09G 5/00
(52) U.S. Cl. ........................ 345/168; 345/730; 700/94; 455/3.06; 84/477 R
(58) Field of Search ................................ 345/168, 165, 345/716, 730; 381/77, 80, 81; 84/470 R, 477 R; 434/308; 700/94; 709/203, 217–219; 714/746, 748, 758, 819; 725/78, 81; 455/3.06

(56) References Cited

U.S. PATENT DOCUMENTS

| 4,377,870 A | 3/1983 | Anderson et al. |
| 4,639,921 A | 1/1987 | Gang et al. ................... 371/53 |
| 4,962,466 A | 10/1990 | Revesz et al. |
| 5,459,458 A | * 10/1995 | Richardson et al. ... 340/845.52 |
| 5,510,602 A | 4/1996 | Evans et al. |
| 5,739,869 A | 4/1998 | Markle et al. |
| 5,765,176 A | 6/1998 | Bloomberg ................. 707/514 |
| 5,818,935 A | * 10/1998 | Maa ........................... 348/467 |
| 5,850,416 A | 12/1998 | Myer |
| 5,860,023 A | 1/1999 | Tognazzini |
| 5,896,129 A | 4/1999 | Murphy et al. |
| 5,914,670 A | 6/1999 | Goodwin, III et al. |
| 5,929,770 A | 7/1999 | Faita |
| 6,011,784 A | * 1/2000 | Brown ........................ 370/329 |
| 6,084,168 A | * 7/2000 | Sitrick ...................... 84/477 R |
| 6,092,230 A | * 7/2000 | Wood et al. ................. 714/755 |
| 6,105,155 A | * 8/2000 | Cheng et al. ............... 714/736 |
| 6,199,186 B1 | * 3/2001 | Chen et al. ................. 714/755 |
| 6,357,031 B1 | * 3/2002 | Lee ............................ 714/758 |
| 6,400,728 B1 | * 6/2002 | Ott ............................. 370/465 |

* cited by examiner

Primary Examiner—Victor R. Kostak
(74) Attorney, Agent, or Firm—Dennis F. Armijo

(57) ABSTRACT

An apparatus and method for the simultaneous presentation of a performance script or other commentary, dialogue or visual information available in the original language or multiple translations which can be selected by the user on portable wireless devices.

24 Claims, 12 Drawing Sheets

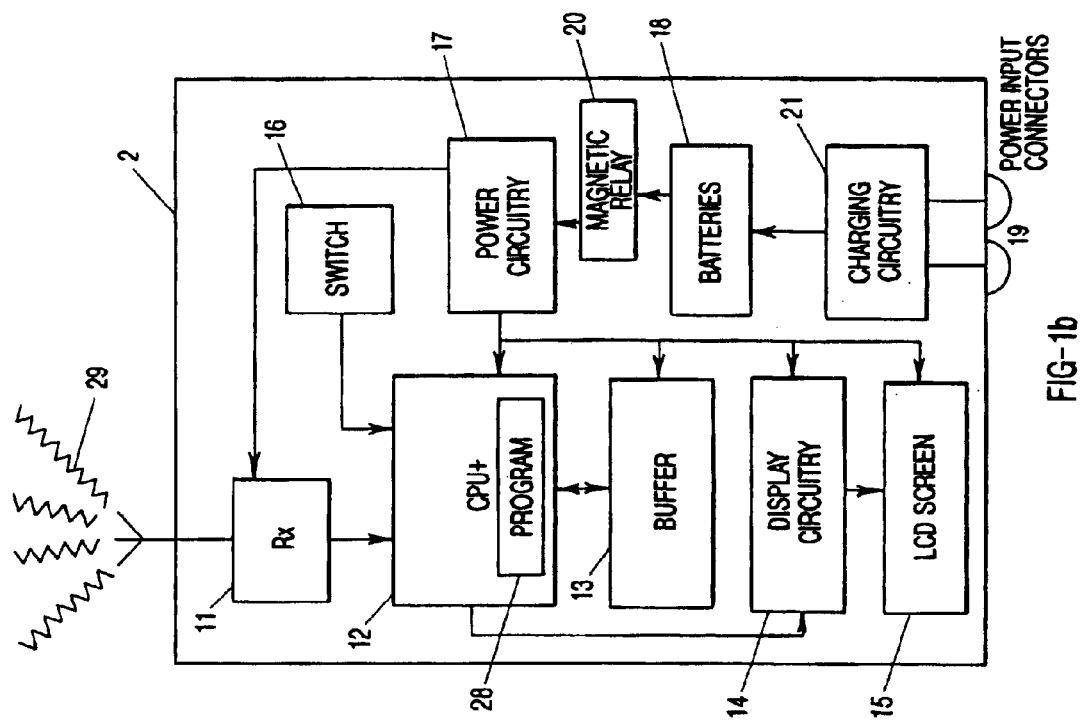
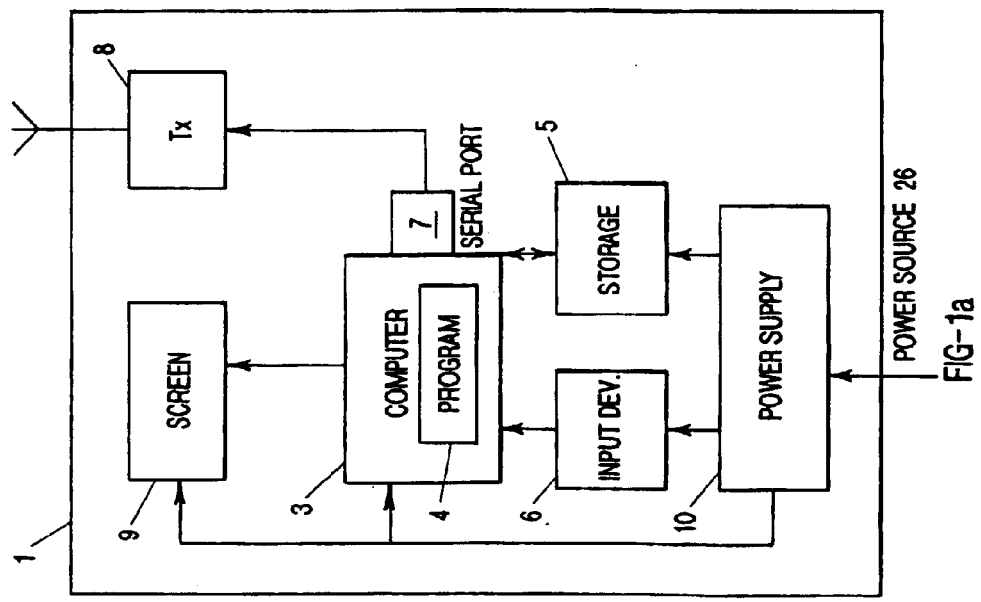

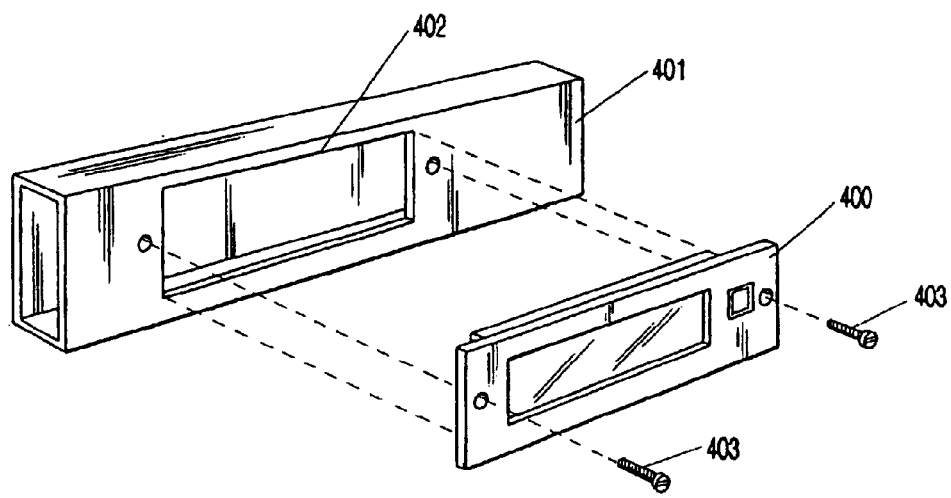
FIG-4a
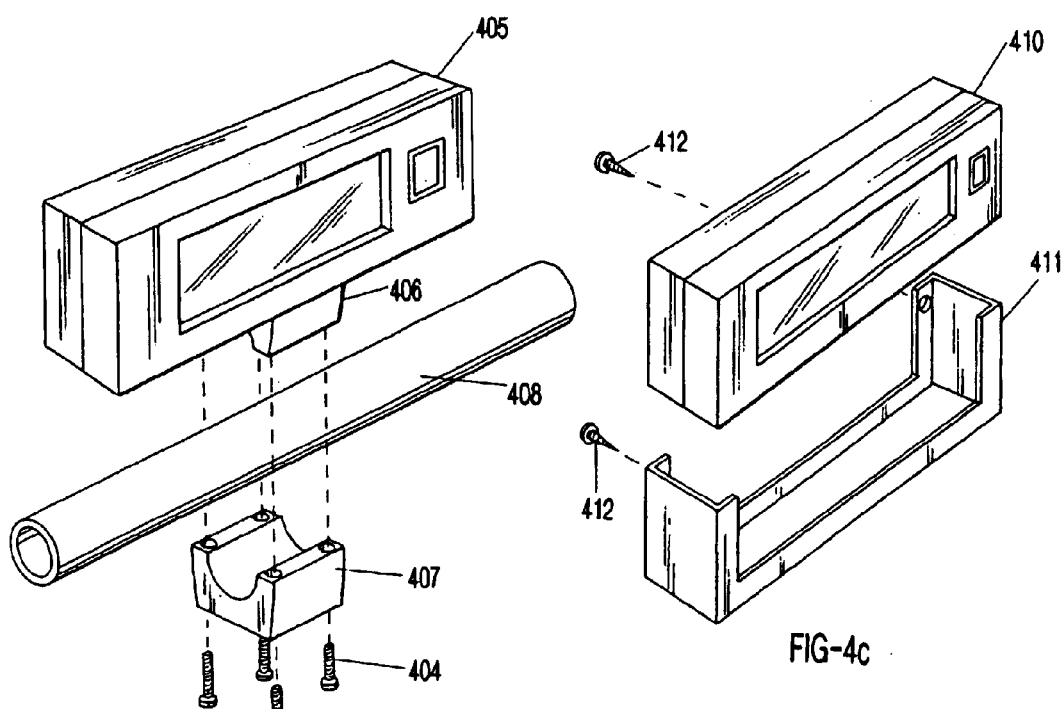
FIG-4b
FIG-4c

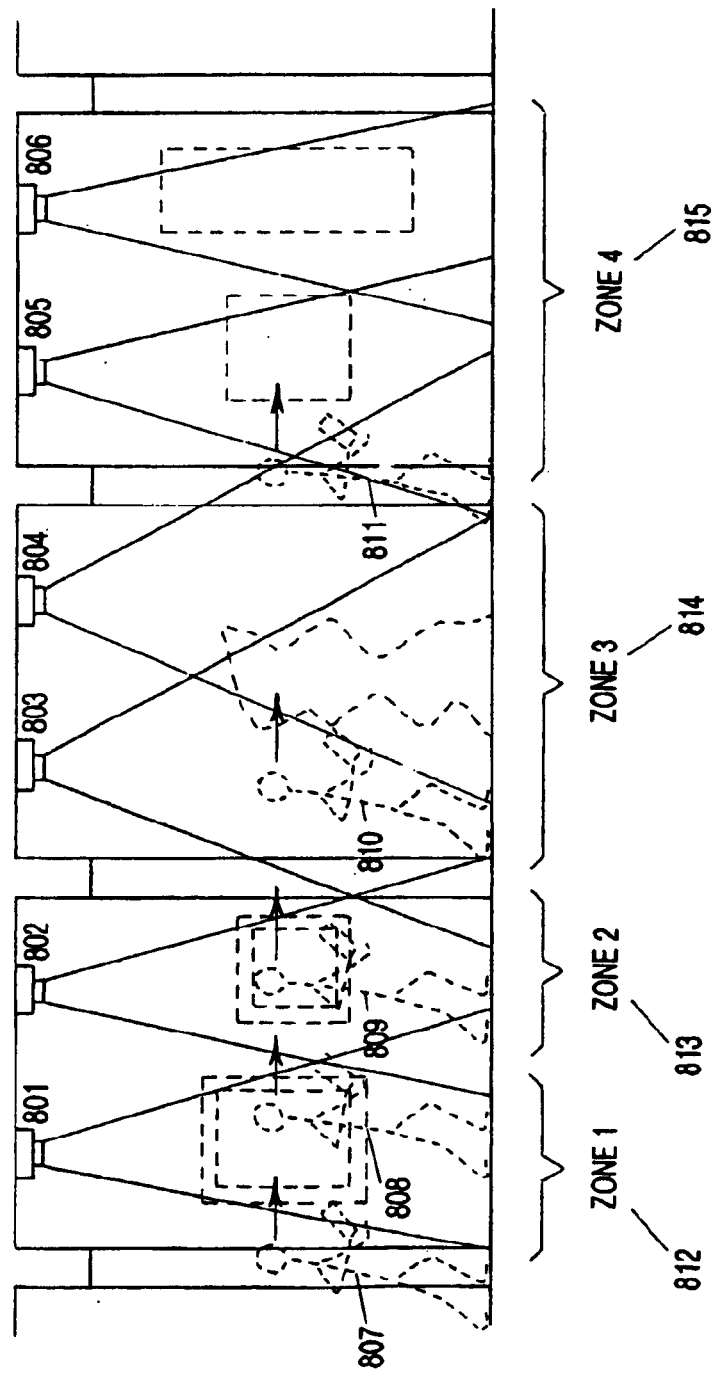

WIRELESS ELECTRONIC LIBRETTO DISPLAY APPARATUS AND METHOD

BACKGROUND OF THE INVENTION

1. Field of the Invention (Technical Field)

The invention relates to communication systems, and more particularly to a wireless communication apparatus and method for the simultaneous displaying of broadcast information by visual and audio means of performances both live and recorded on multiple channels whereby each channel can contain text in a language as selected by the user.

2. Background Art

The current state of the art for displaying translations is well described in U.S. Pat. No. 5,739,869 to Markle, et al. There are some limitations of the method and apparatus described therein. The invention described in U.S. Pat. No. 5,739,869 presents a method of distributing multiple channels of information to multiple users. This new invention provides a means to overcome the shortcomings of the Markle patent. A wireless means of transmitting data was described in U.S. Pat. No. 5,739,869 but no details were provided. It is well known to those familiar with electromagnetic transmission of data, that there is a high probability that the transmitted data will be corrupted during transmission. Various means exist to detect and correct such corruption. First, the frequency used to transmit can be selected so that there are no other sources of similar frequency operating within the broadcast area. Spread spectrum transmission means well known to those practiced in the art is another way of attaining clear and reliable transmission of data. Even with these two highly effective means of avoiding interference, it is still likely that corruption can occur. The method commonly used to ensure that data is received correctly is to retransmit the data. This requires two-way communications and a communication protocol, of which there are many possible types described and well known to those familiar with the art. Two-way communications are not practical in this application because of the large bandwidth required, the complicated protocol and the cost of the implementation, particularly with large installations comprising several thousand receivers.

Data correction methods are sometimes used to repair the damaged data transmission. These methods use several transmissions of the data and then apply a comparison of the received data to determine which transmission of the several received is correct. This method has a high statistical probability of detecting burst errors, but cannot detect and correct all errors. It is likely that errors in transmission will be passed along. In audio applications this is not a problem because the small errors passed will probably not be noticed in the whole transmission. These small errors are a problem with transmitted data because the characters presented will contain spurious errors which are readily detected by the users. It is therefore possible that the corruption of the data could change the presented text in such a way that an inappropriate meaning is conveyed. It is not possible to provide data correction of high enough certainty without drastically increasing bandwidth or transmission and processing time, and so is not a feasible alternative for this application. If a receiver does receives corrupt or incomplete data it can request that the information be retransmitted. This procedure becomes extremely complicated when many receivers request retransmission and requires a high bandwidth transmission medium to handle the requests. If a receiver is not aware that data has been transmitted because the whole transmission was missed, then it cannot request a retransmission of the data.

The present invention describes a method of achieving reliable low cost retransmission of data using low bandwidth one-way data transmission to many receivers. The method identifies each packet of data to be transmitted with a unique identifier. The packet then has a CRC (cyclic redundancy check) calculated and appended to the packet. This complete packet is transmitted and received by the individual devices. If the unique identifier is different to the one packet received previously, then the display device proceeds as follows. If the identifiers are identical then the transmission is ignored. The individual display devices then calculate another CRC using the received data and if the received and calculated CRC's are identical, then the data can be reliably declared as correct and the display device can then process the data. If the CRC's are not identical, then an error has occurred in transmission. The device or devices that received corrupted data discard that data and wait for the next transmission. If only corrupted data is received then nothing is presented by the display module, instead of displaying incomplete or mangled data that causes more problems.

The addition of batteries and wireless data transmission means allows the device to be portable. This has many advantages, to install the system in an existing house no power and data wires need be installed, this saves significant cost when installing the system.

The main problem with a "hard-wired" installation is that the whole installation needs to be installed at one time, the necessary construction work required, and the installation time needed indicates that the space cannot be used for performances while the installation is occurring. Some buildings are protected by a historic building covenant and any changes to the fabric of such buildings are prohibited. There is considerable cost involved in retrofitting such a system to an existing building, as the structure, design, layout, construction methods, and fittings are often not compatible with the later installation of such a system. Avoiding such installation work saves significant time and money Another problem with such "hard-wired" installations is that it is economic only to install the system in one operation. The purchasers of such a system need to pay for the installation of the complete system at one time as staging the installation is much more expensive and time consuming. A wireless installation allows for an installation to proceed in stages, the system being fully operational but not necessarily complete at any one time. The wireless system allows for partial installations where a number of people are free to sit at any location in the house, something not possible with a "hard-wired" installation. The number of display units can be increased at any time as demand or finances permit.

When a hard-wired system is installed in a newly constructed system, significant savings can be realized with the inclusion of the necessary system installation work and components into the buildings construction schedule. Due to the nature of the system, much of the installation can only be performed after the other trades involved in the construction have completed their work. This means that the overall construction time must be extended to allow for the system installation to be completed before the building can be opened. This scheduling problem is extremely difficult to solve without increasing the cost of the building installation. A wireless installation can occur during the last stages of the buildings construction without affecting the building schedule.

U.S. Pat. No. 4,438,432, to Hurcum, discloses an information display system which uses multiplexed data which is transmitted over wires. This system uses addresses to decode transmitted data.

U.S. Pat. No. 4,361,848, to Poignet, discloses a tele-text method of displaying text on television using control characters. The system uses a keyboard to access information and does not support live performance use.

U.S. Pat. No. 5,850,416, to Myer, teaches a wireless, transmitter-receiver information device which uses no batteries, and utilizes an inductive power transfer method, whereby the power to operate the display unit is superimposed on the data signal. The system makes no mention of live performances, multiple channels or simultaneous display of multiple channels.

U.S. Pat. No. 5,896,129, to Murphy, shows an interface for an interactive flight entertainment system for passengers with special needs. The described system is a method for guiding a user though a long series of required key-stokes to access their selection from a wide range of choices. One of those options is closed captioning which is already well known to those familiar with the art, and audio captioning for the hearing impaired. The system described is a method of selection of such choices but fails to describe how such choices are transmitted.

In another embodiment of the invention the display output is limited to one character, and in very large size. One or more of these single character embodiments can then be arranged to produce a large multi-character display of any size or configuration. Economies of production are realized because the individual single character embodiments are much smaller than a complete sign capable of displaying multi-character text, and therefore less expensive and easier to manufacture. This "modular design" approach allows for different configurations to be used. Each single character embodiment has a different "Channel" selected and only receives data which is identified as being for that specific channel. Several of these large multi-character assemblies can be used, all displaying the same information or different information such as translations into other languages.

SUMMARY OF THE INVENTION
(DISCLOSURE OF THE INVENTION)

In accordance with the present invention, there is provided a wireless apparatus and method for simultaneously displaying a selected channel of data to a remote site. The preferred apparatus comprises a portable multi-channel apparatus for the storing, transmitting, and simultaneous displaying of at least one selected channel to a remote site without any connecting wires. The preferred apparatus is battery powered and the data is transmitted by electromagnetic radiation. The data is sent from a main control unit to a transmitter that then broadcasts the data. The portable multi-channel apparatus can then receive the transmitted data and display it, as instructed by the user.

The transmitted data package preferably comprises a packet header, unique packet identifier, a header for at least one channel, an end of message instruction for the at least one channel, a data integrity verification means, and an end of packet identifier. The data packets are continually rebroadcast at regular intervals by the main control unit and transmitter. The receipt of the at least one display of the next data packet with a different unique packet identifier causes the display to verify that the data package is correctly received, and if so, overrides the stored data in the buffer, otherwise the display ignores that received transmission and waits for the next transmission where the process is repeated. This ensures that the data received, processed, and displayed is identical to the data transmitted from the main control unit without the complication of bi-directional communications. In the event of an incomplete or corrupted transmission receipt, the display waits for another transmission. The data packets can also comprise at least one reserved character to control display brightness, image brightness, and image display time. The main control unit comprises an apparatus for selecting the at least one predetermined portion of the preselected sequence of text.

The preferred system utilizes the UNICODE method of encoding characters, giving access to all character sets for all written languages.

The apparatus for distributing data comprises at least one transmitter and at least one receiver. The data is transmitted by electromagnetic radiation means.

The primary object of the invention is a portable display unit that presents a channel of information to view, describing a performance to audience members either individually or to a group.

Another object of this invention is to provide a scalable system that may be partially or completely installed or expanded at any time. Installation work would cause minimal disturbance to the building and environment.

Yet another object of this invention is to have the capacity to present any written language at any time.

Yet another object of the invention is to provide the choice of the transmitting frequency which can be changed for use in other countries or where existing equipment is already installed and would not cause interference.

The primary advantage of the present invention is that the installation of the system causes minimal disturbance to the environment, power and data wires do not need to be installed in the installation site.

Another advantage is that the system can be portable for use in touring productions whereby the invention can be set up quickly and easily in different locations and be assured that the system is available for use for that production.

Another advantage of the portable system is that it is scalable, that is, it can be partially installed and made operational and then at a future date be expanded as needs require or funding becomes available. In this way immediate compliance with disabled persons legislation is possible.

Another advantage is that people with disabilities have access to visual or audio information.

Another advantage of the system is that it is possible to use it in outdoor locations. Such usage would include outdoor concerts and performances, multi-cultural events, stadium events, sporting events, religious services, and such events.

Another advantage of the system is that by using a localized transmission medium it is possible to transmit in a limited area. The system can be used in applications such as galleries or museums where there are many exhibits in many rooms. Transmitters could be placed near exhibits and transmit information about such exhibit or all the exhibits in an area. As the patron enters the transmission zone their display would receive the data for the nearest exhibit and display it in the language selected. Thus as the patron moved about the gallery or museum, their display would, in a timely manner, present information about the nearest exhibits.

Another advantage of the system is that by using a wide-ranging transmission medium it is possible to transmit to a large area, comprising multiple buildings or large geographic zones.

Another advantage of the system is that there is no limit to the number of units that can simultaneously operate. Additional transmitters may be required to cover the necessary area depending on the space and transmission medium used.

Another advantage of the invention is that because it is powered by battery, it can operate independently and does not need a power distribution means to be installed at the point of use.

Another advantage of the invention is that because it receives its data by electromagnetic radiation, it operates independently and does not require cables to be installed at the point of use.

Another advantage of the system is that by utilizing the UNICODE character set, every unit is capable of displaying any written language. Multiple variations of the unit are not required for different countries and all languages are available on every display if required. Other written graphic information such as symbolic representation of sign language for the deaf can also be implemented.

Another advantage of the system is that complex formatting of the displayed text is achieved by special formatting codes. These special formatting codes allow the text to be positioned anywhere on the screen while still retaining the text information in compact character code form. This has the advantage of containing the data in very a compact form, and thus reduces the amount of data that would need to be transmitted if a graphic bitmapped scheme was employed.

Another advantage of this invention is the redundant transmission of the data packets. If a display unit does not receive a complete data packet the device waits for the next transmitted packet. After receiving a packet the device ignores all future rebroadcasts of the data until a new data packet is detected. This means that there might be a small delay in presenting the text if the reception of a data packet is missed because of interference or obscuring of the signal; however, once clear communication is established, the display unit would function normally without complex and costly two-way communications.

Other objects, advantages and novel features, and further scope of applicability of the present invention will be set forth in part in the detailed description to follow, and taken in part will become apparent to those skilled in the art upon examination of the following, or may be learned by the practice of the invention. The objects and advantages of the invention may be realized and attained by the means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention, and together with the description, serve to explain the principles of the invention. The drawings are only for the purpose of illustrating a preferred embodiment of the invention and are not to be construed as limiting the invention. In the drawings:

FIG. 1A is a schematic diagram of the main system control unit;

FIG. 1B is a schematic diagram of a portable wireless unit;

FIG. 4A shows the permanently mounted display module mounted into a railing;

FIG. 4B shows the permanently mounted display module mounted on a railing;

FIG. 4C depicts a receptacle apparatus for the portable embodiment of FIG. 1B;

FIG. 8 is diagram of an art gallery application; and

DESCRIPTION OF THE PREFERRED EMBODIMENTS (BEST MODES FOR CARRYING OUT THE INVENTION)

This invention relates to a method for displaying, simultaneously, at a number of locations, by wireless means, a user selected translation of a performance or event. The information is transmitted to the display units, and upon command each display unit displays the selected channel of information simultaneously with the other display units.

Figure 1D:
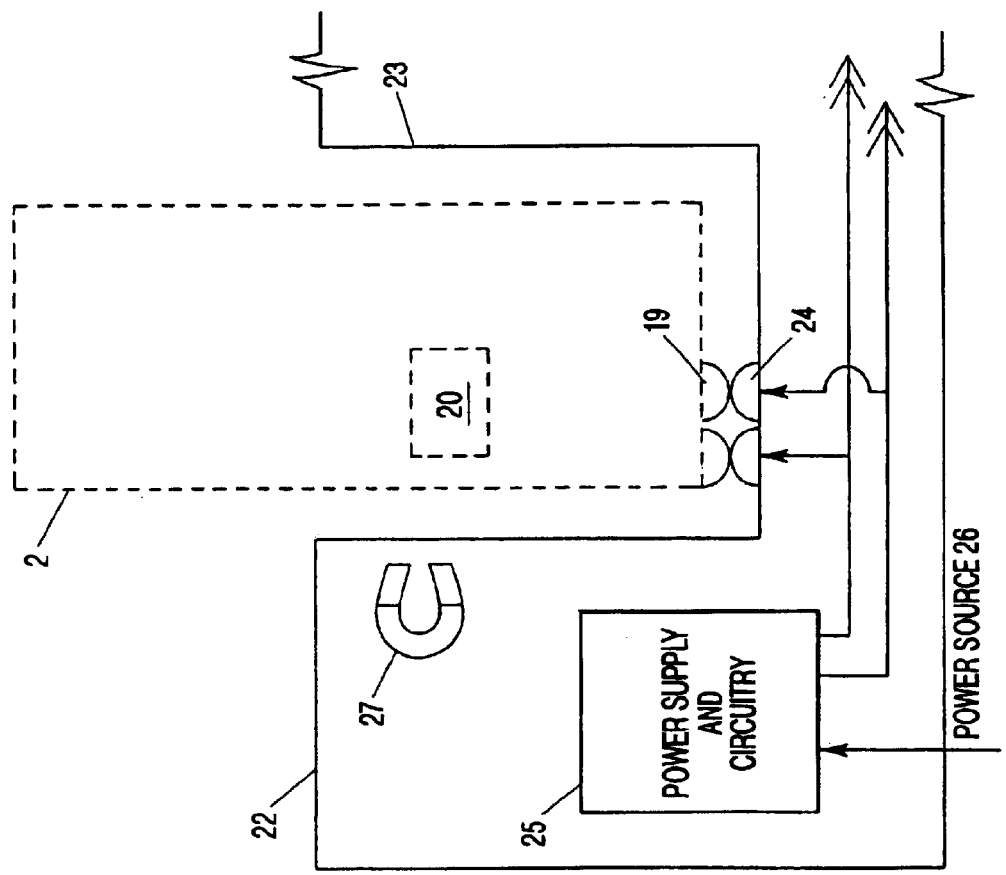
FIG. 1D is a schematic diagram of the preferred battery charger for the embodiment of FIG. 1B.
Figure 1C:
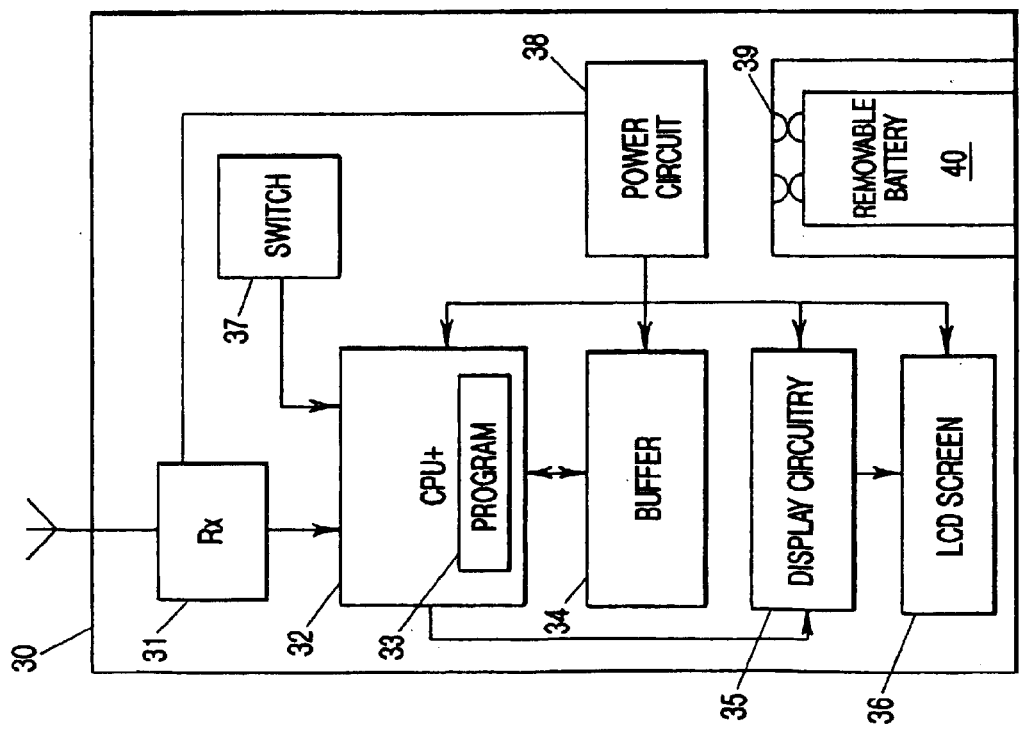
FIG. 1C is a schematic diagram of a non-portable unit.
Figure 2A:
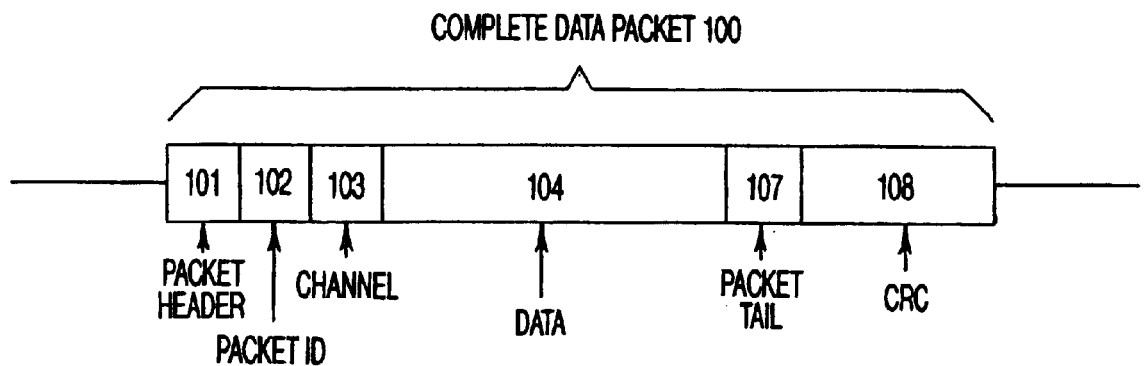
FIG. 2A depicts a complete data packet.

The preferred apparatus and method is shown in FIGS. 1A, 1B, 1C, and 1D. There are three major sections to the preferred embodiment: main control unit 1, display unit 2, and recharging unit 22. Computer 3 is loaded with custom program 4, which enables computer 3 to read data from storage medium 5 containing text of a production or other visual information. Upon command, via input device 6, computer 3, and program 4 take the next piece of predetermined data, adds control codes, and assembles the data packet 100 which is shown in FIG. 2A. The control codes include packet header 101, a special reserved character defining the start of a packet and packet identifier 102, which is a unique identifier for each data packet. Custom program 4 then inserts a channel identifier 103, and subsequently followed by the data 104 for that channel which includes text and any optional control characters for brightness, fades, and display time. The program then inserts another special control character, packet tail 107. A data integrity character 108 of predetermined length is generated by a form of cyclic redundancy checker (CRC) of known length which is well known to those practiced in the art, and appended to the data packet immediately after the packet tail 107. The data packet 100 is now complete and ready for transmission. Computer 3 then directs the data packet to output port 7 of computer 3 that is connected to transmitter 8. Transmitter 8 then radiates electromagnetic radiation 9 in the manner consistent with such devices to broadcast the data. The above procedure is repeated for all individual channels of data. The data is then rebroadcast to allow the modules receiving data an opportunity to receive data if the previous transmission was not received correctly.

When all necessary data has been transmitted, then a display text instruction packet 109 is transmitted causing the display modules to present on their screens the data received for the channel currently selected. See FIG. 2B. The packet contains a packet header 100, a packet identifier (ID) 101, the special reserved character show 106, a packet tail 107 and a CRC 108 generated from the preceding data. When received by the display modules, this packet 109 causes the modules to display the channel of information for the currently selected channel using the data received beforehand.

Several transmitters may be required for complete coverage depending on site conditions. The display modules contain the means to select one of several transmission frequencies. Several transmitters set to operate on different frequencies can be positioned to provide optimum coverage to different zones within the auditorium. Display devices within each zone can be set to receive a specific frequency thereby avoiding multipath reflections often a problem with multiple transmitters.

As shown in FIGS. 1A, 1B, 1C, and 1D, electromagnetic radiation 29 emanating from transmitter 8 is received by receiver 2. The received data is then sent to computer 12 that is running custom program 28. The data is temporarily stored in buffer 13. When appropriate instructions are received as specified in FIG. 2A, the receiver 2, through display circuitry 14, shows the specified text on Liquid Crystal Display (LCD) screen 15 as selected by switch 16. Power for receiver 2 comes from batteries 18. A normally closed magnetic reed relay 20 allows power to flow to the power circuitry 17 which supplies various voltages needed for operation. When receiver 2 is placed in receptacle 23 included in charging station 22, a magnet 27 causes reed relay 20 to open thus turning off the receiver, the receiver 2 automatically turning on when removed from charging station 22. Power is transferred from power supply 25 via electrical contacts 19 and 24. In an alternate embodiment, receiver with removable battery 30 contains a removable battery 40 which can be removed for recharging. The circuitry and components of receiver with removable battery 30 are identical to those found in receiver 2 with the exception that charging circuitry 21 and reed relay 20 are not included.

The preferred mounting methods of the apparatus are shown in FIGS. 3A, 3A, 3C, 4A, 4B, and 4C. Receiver 300 is securely attached to the buildings infrastructure by flexible metal stalk 302 that is held in place by screws 305. Alternatively, receiver 300 slips onto pin 301 which is connected to flexible metal stalk 302. Stalk 302 slides through mounting block 303 and is held in place when flexible stalk 302 is bent over to support receiver 300. Mounting block 303 is attached to armrest 304 of building infrastructure by screws 305. When receiver 300 is removed from flexible stalk 302, it may be lowered through mounting block 303 to its storage position.

In an alternative embodiment, the display device is attached to a railing positioned over or behind the seats in front, as shown in FIGS. 4A and 4B. This allows the aisle space to remain clear for emergency egress. In another alternative embodiment the display device is mounted on a wall, partition, or existing railing by an adjustable mounting means. In this way the display devices may be widely mounted to existing architectural features. Receiver 400 with front bezel only is mounted into hole 402 machined in rail 401 and secured by screws 403. Alternatively, receiver 405 is mounted on rail 408 by means of specially shaped rail clamps 406 and 407. The entire assembly is fastened by screws 409. In yet another embodiment, receiver 410 is held securely in cradle 411 that is mounted to the buildings infrastructure or seats by screws 412.

Figure 5A:
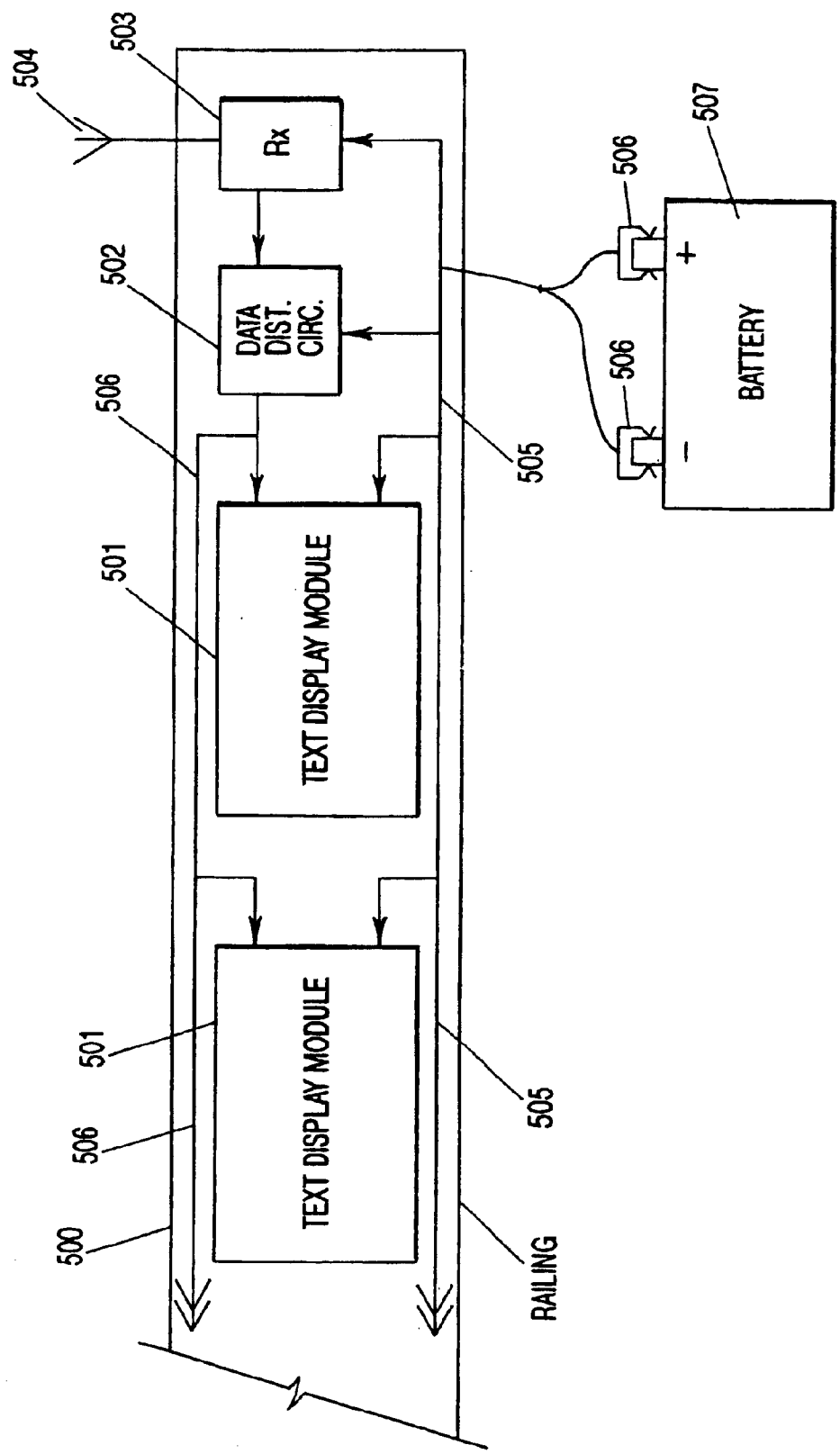
FIG. 5A schematically depicts the system of FIG. 4A.
Figure 5B:
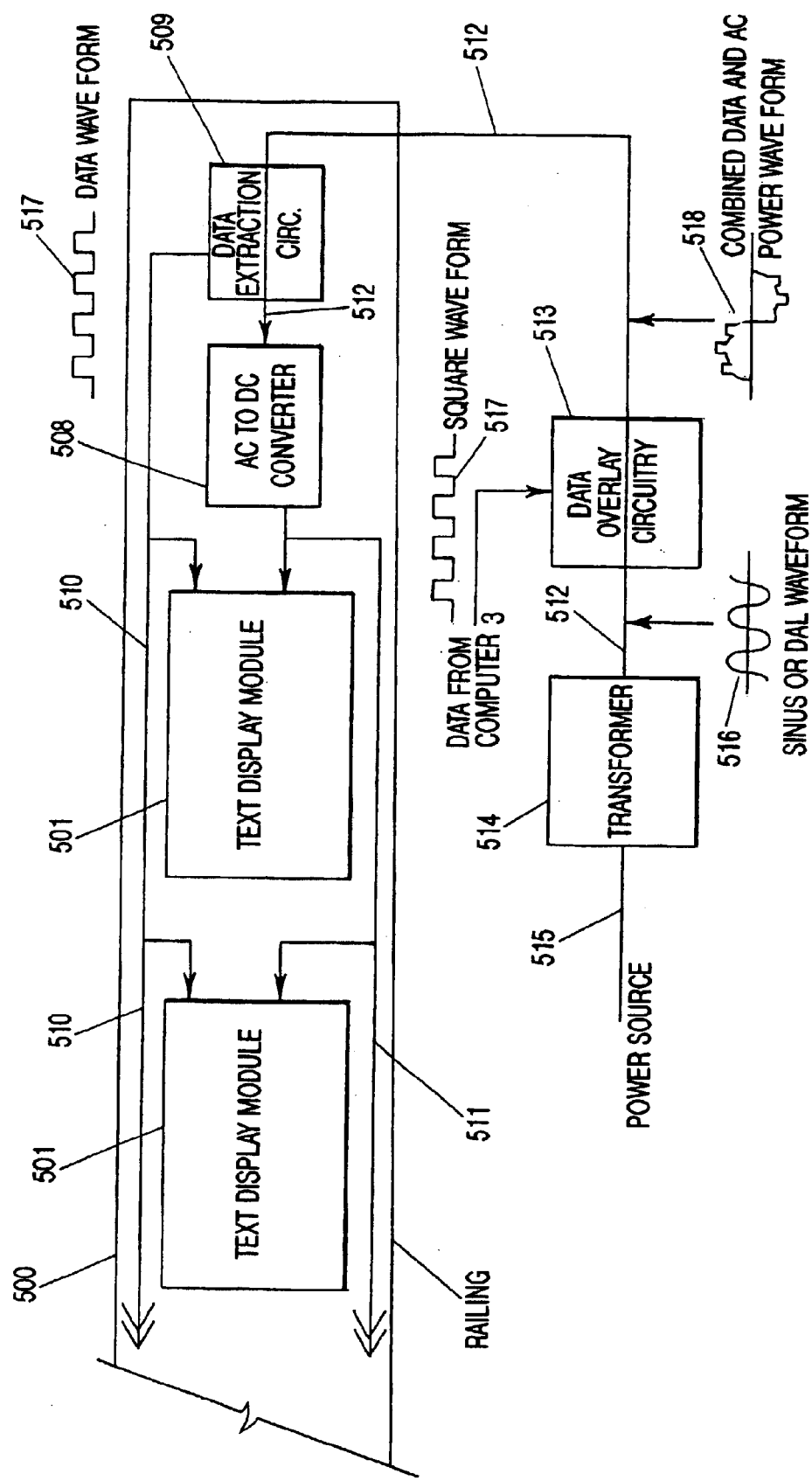
FIG. 5B schematically depicts the system of FIG. 4A with an AC power source.

Alternative embodiments of rail mounted systems are shown in FIGS. 5A and 5B. Railing 500 has text display modules 501 mounted as shown in FIGS. 4A and 4B. Also mounted inside the railing 500 is a receiver 503 with antenna 504 that receives transmitted data. The data is then passed to data distribution circuit 502 which changes the electrical properties of the data signal to a form that can be distributed to multiple text display modules 501. Power is supplied to the rail assembly from large storage battery 507 that can be mounted under a seat at the end of the row. Wiring 505 transfers electrical power through battery connectors 506 to the text display modules 501, the receiver 503 and the data distribution circuit 502.

The text display modules 501 can also be mounted in railing 500 and receive power and data over two wires. AC power source 515 energizes transformer 514 to produce 24 volt alternating current which has sinusoidal waveform 516. Data from computer 3 is sent to data overlay circuitry 513 that adds the data signal 517 to the sinusoidal waveform 516. The combined data and signal waveform is transmitted through wires 512 to the railings 500. Data extraction circuitry 509 extracts data signal 517 from combined waveform 518 and sends it to text display modules 501, via wires 510. Combined signal 518 transmitted on wires 512 are connected to AC to DC converter 508 which changes the received power to a form usable by the text display modules 501. DC electricity is distributed to text display modules 501 by wires 511.

Figure 6:
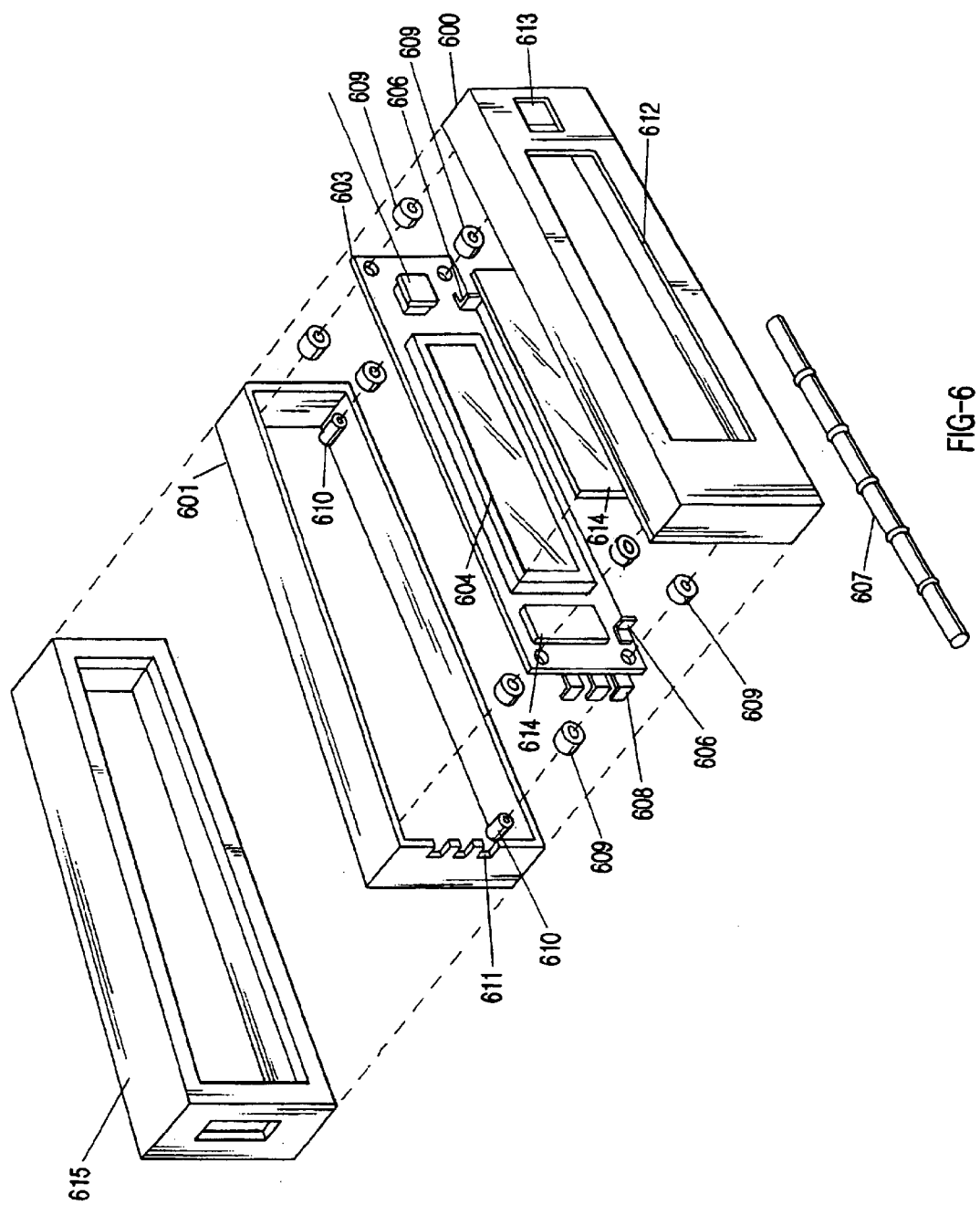
FIG. 6 is an exploded view of the preferred wireless text display apparatus.

FIG. 6 shows an exploded view of typical wireless text receiver. Case front 600 and case rear 601 have integral mounting pins 610 incorporated. Shock-absorbing resilient mounts 609 are then fitted to pins 610 and hold circuit board 603 in position while providing a degree of shock resistance to the assembly. Circuit board 603 contains receiver circuitry as shown in FIG. 1. The LCD screen 604, antenna 614, switch 605, filter 614, batteries 607, charging contacts 608, CPU, and associated circuitry are attached to the circuit board 603. A transparent plastic sheet 614 coated with a hardened scratch resistant and glare inhibiting surface is placed over the LCD display 604, to increase character contrast, modify the character color, and protect the display from damage. Plastic sheet 614 may be optionally colored. Transparent directional optical filters manufactured by 3M Inc., or the like, which limit the angle at which the display can be seen, can also be included. The entire circuit board assembly just described is further isolated from shock by shock-absorbing mounts 609 inside case parts 601 and 600. This entire assembly is fitted inside a resilient rubber overmold 615 that provides further shock isolation and provides an comfortable and interesting texture to the complete assembly.

In an alternate embodiment the charging circuitry is located in the charging station. Removable battery packs can then be recharged remotely and then the charged batteries attached to the display modules as needed. The advantages of this embodiment include reducing the weight of the system and complexity of the display module, allows the display modules to be permanently mounted, and allows for batteries to be easily replaced as needed.

The receiver circuitry can also be a separate circuit card which attaches to display circuit card via a connector. This would allow the transmission frequency to be changed for different countries (not shown).

In an alternate embodiment the data transmitted is encrypted prior to transmission by means well known to those practiced in the art. This encrypted data is received by the display modules, the data extracted from the transmission by decryption means well known to those practiced in the art and processed as usual. This has the advantage of making the transmitted data incomprehensible to others without knowledge of the encryption means. These transmissions can be made more secure by using spread spectrum transmission means that are well known to those practiced in the art.

In another embodiment the batteries are housed within a removable molded plastic casing which attaches to the display device. The battery packs can then be detached from the display device for recharging at a remote location. Recharged batteries can then be made available to those wishing to use the devices. This has the advantage of removing the recharging circuitry from the device and allows the display devices to be permanently mounted. A further advantage is when the display devices are permanently mounted, the case does not need to be constructed as robustly because the danger of dropping the device onto the floor no longer exists. A further advantage is that a permanently mounted display module is less likely to be stolen than a completely portable one, and therefore some form of deposit does not need to be collected from the user to ensure its return after use. In an alternative embodiment a single larger battery is connected via wires to a series of display devices mounted in a railing. The battery would be mounted under a seat at the end of a row of seats. The battery would have sufficient capacity to provide power to the devices for the desired length of time. At appropriate times the battery could be recharged. This has the advantage of reducing the possibility of theft or damage to individual batteries and also of reducing the labor involved in collecting and recharging individual batteries. Another advantage is that such an embodiment can easily be installed in buildings where it is not feasible to run power wires.

A single character display device can be configured to present the specific transmitted data on one or more assemblies. Other information can be transmitted to appear on different display assemblies. The assemblies can be mounted in one or many locations. It is then possible to present different text in different languages in different locations. Such a system has applications in public spaces where different multi-lingual messages are required.

Figure 7A:
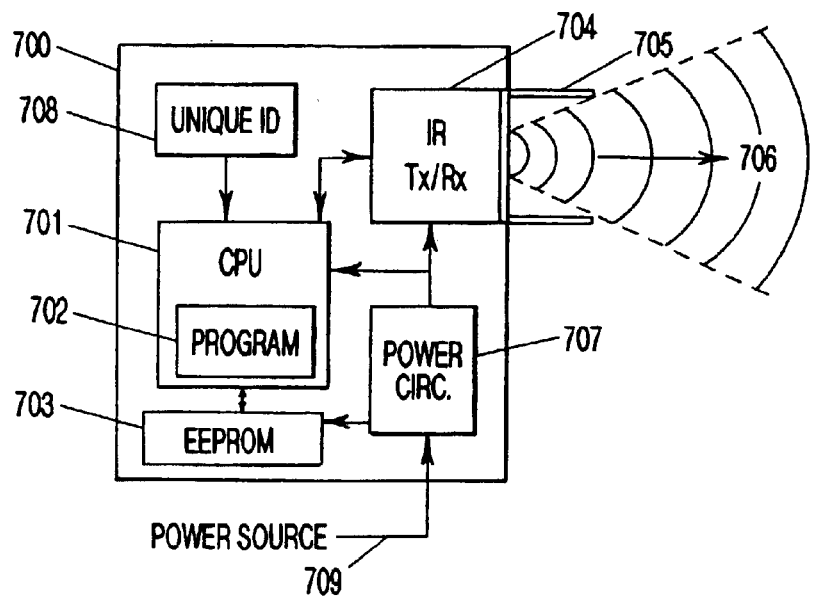
FIG. 7A depicts an infrared stand alone transmitter.
Figure 7B:
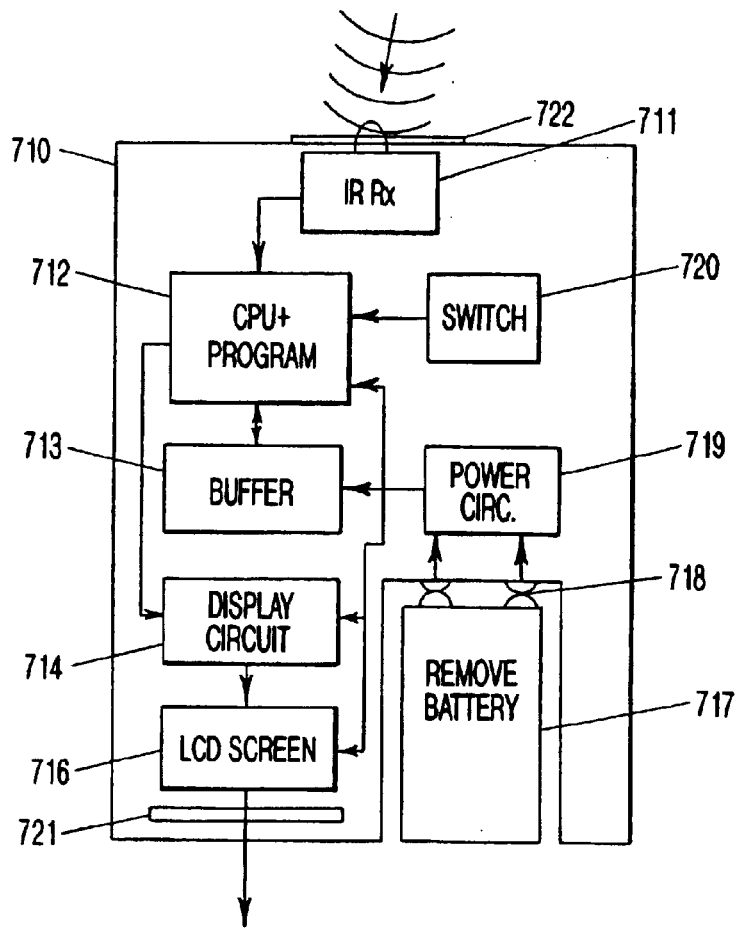
FIG. 7B depicts an infrared receiver for the embodiment of FIG. 1C.
Figure 7C:
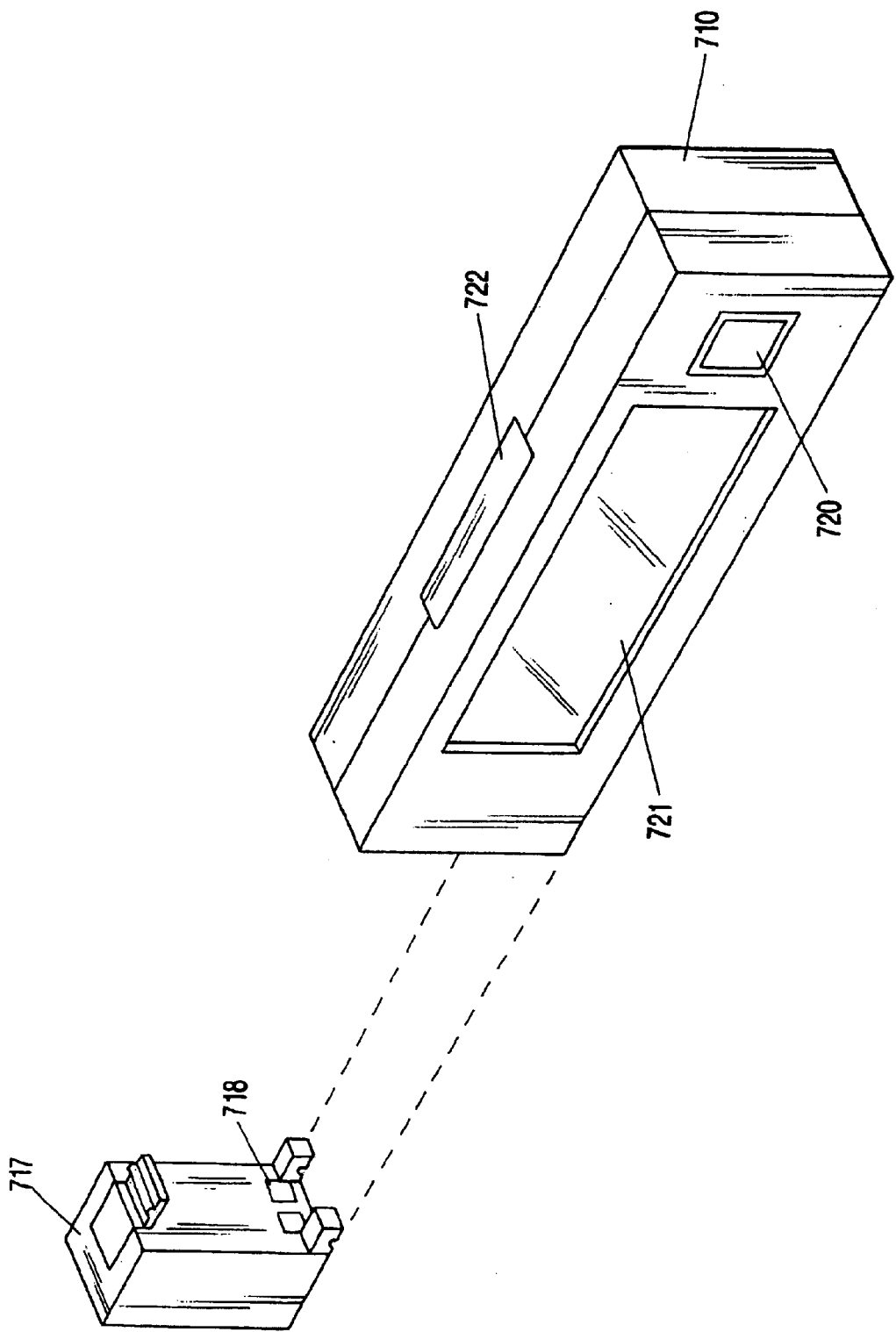
FIG. 7C shows a method of affixing a battery to the embodiment of FIG. 1C.

In an alternate embodiment shown in FIGS. 7A, 7B, and 7C, the transmission of data is performed by infra-red radiation. Such transmission methods utilize transmitters such as those manufactured by Senheisser, Inc. These are line of sight systems. In this embodiment a stand alone programmable transmitter 700 comprising a computer 701 with embedded program 702 accesses data stored in non-volatile memory 703 and sends data to Infrared transmitter/receiver 704 for broadcasting. Shroud 705 can be adjusted to limit or direct the transmission zone 706 of stand-alone transmitter 700. Transmitter 700 can be reprogrammed by transmitting infrared radiation from a portable computer equipped with an Infrared transmitter towards stand-alone transmitter 700. Computer 701 receives data and replaces existing stored data with received data. Stand-alone transmitter 700 then begins transmitting data at specified intervals. In this way many transmitters could be installed and programmed to transmit either unique or the same data.

Another application for the invention is shown in FIG. 8. As shown the invention can be utilized in an art gallery. Although only an art gallery is disclosed, the invention can be use in other similar applications. When such a system is used in an art gallery, for example as shown in FIG. 8, individual transmitters 801, 802 transmit different data to smaller zones in front of the exhibits. As a patron 807, 808, 809, 810, and 811 moves from one zone to the next 812, 813, 814 and 815, the display unit presents the relevant data in each zone. In the same gallery there might be one large exhibit in the middle of the room, where one or more transmitters 803, 804 transmit identical data over the entire room. In another arrangement, transmitters 805, 805 would be placed above the entrances to the room and transmit identical data, so that on entering the room the display module would receive the new transmission and present information. Information about individual exhibits could be sent to different channels and as the patron moved through the exhibits. A press of the button would present new information. On moving to another room the display unit would receive new information and present it. This application is best suited to line of sight transmission media because clearly defined zones are required.

Figure 9:
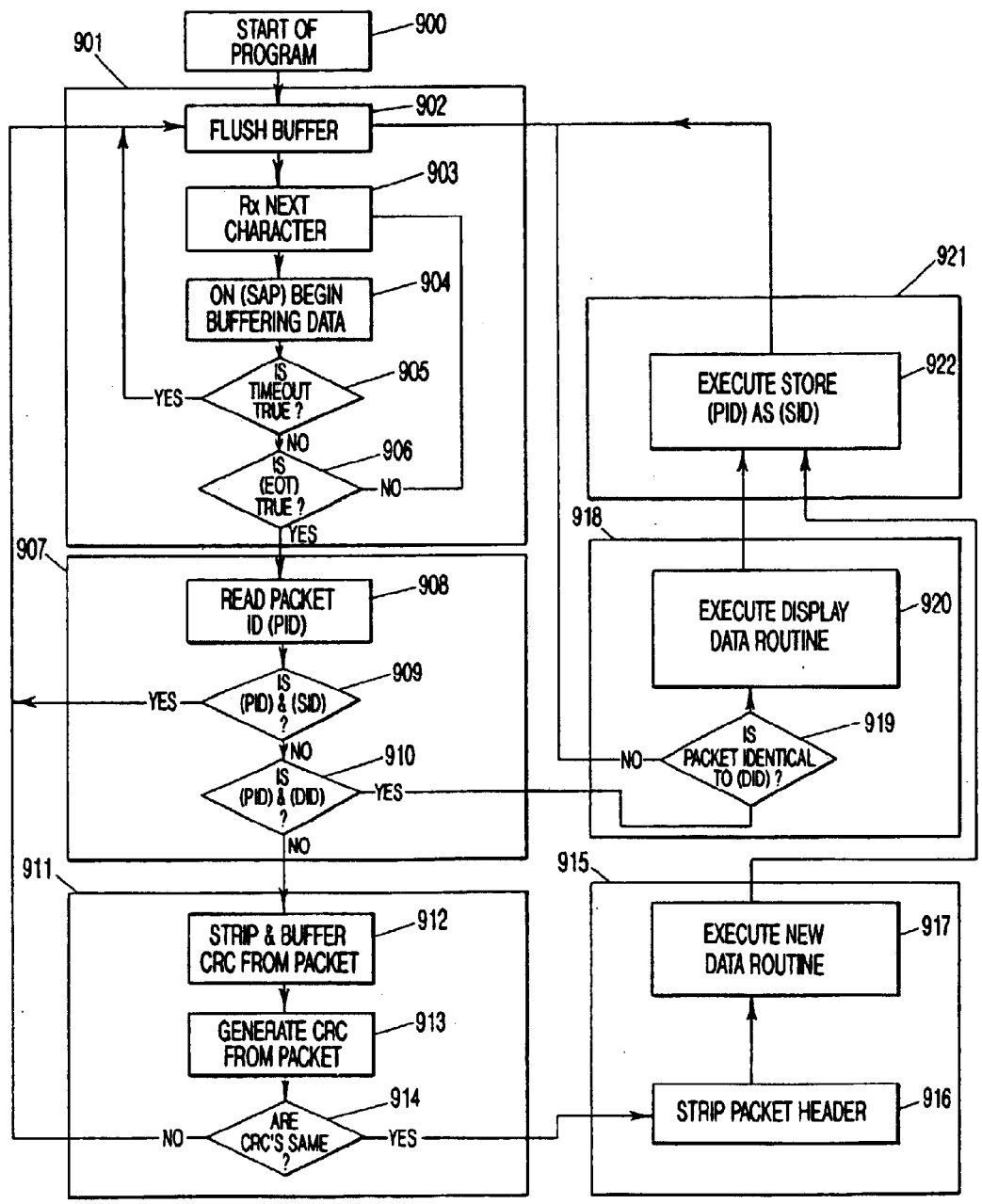
FIG. 9 is program flow chart.

The program's flow diagram is shown in FIG. 9, as follows:

to Program Block A 901: The start 200, the program looks for data coming in from the receiver. After identifying a packet header character 100 it then reads and stores all characters 903 until a packet tail 107 is encountered 906, or it times out 905, and resets and returns to the start of Program Block A 902, after a predetermined period.

Figure 2B:
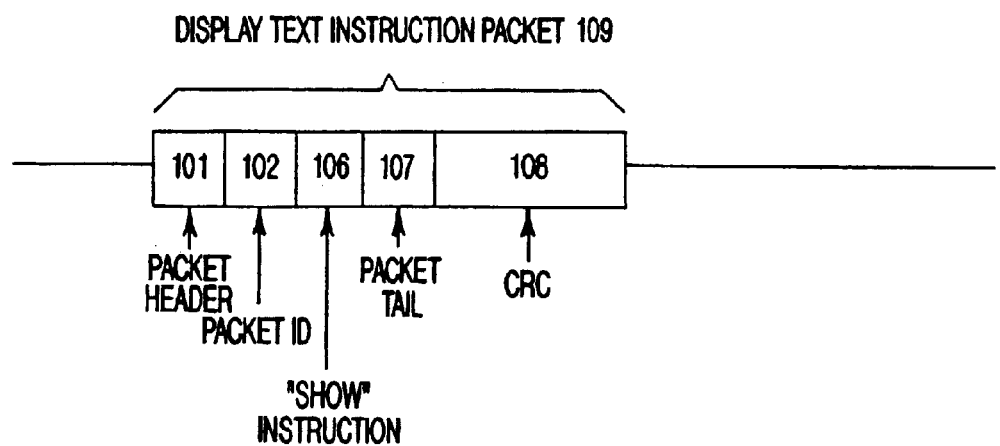
FIG. 2B depicts a display text instruction packet.
Figure 3A:
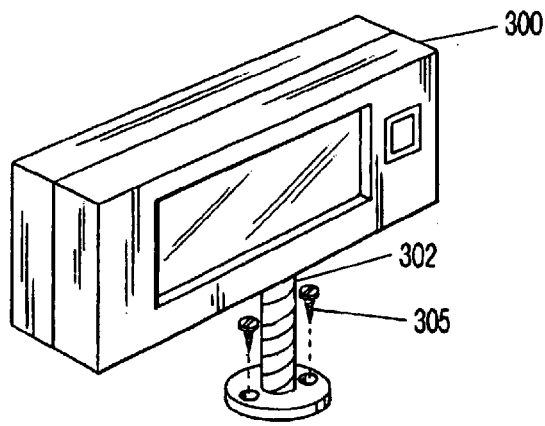
FIG. 3A shows a permanently mounted display module.
Figure 3B:
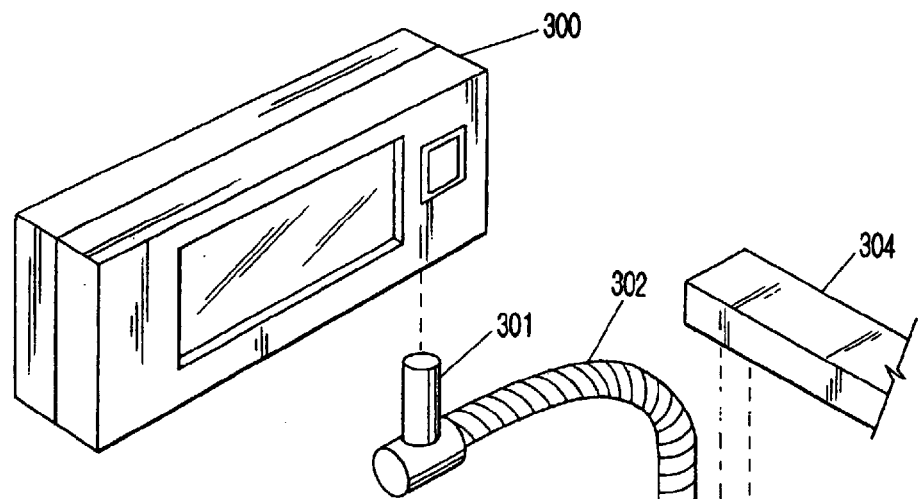
FIG. 3b shows the preferred mounting apparatus for the portable display of FIG. 1B.
Figure 3C:
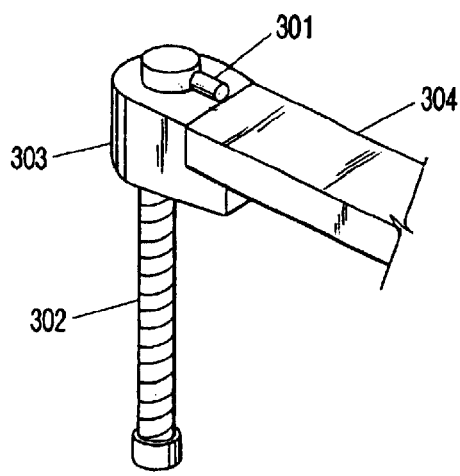
FIG. 3C shows the mounting apparatus of FIG. 3A in the retracted position.

Program Block B 907: Computer 10 executes the next program block, Program Block B 907 and reads the packet identifier 110. If this identifier 110, is different than the one stored in computer memory 909, the program proceeds to check if the received packet is the same as the display instruction packet as shown in FIG. 2B. If they are identical, then Program Block E 918 is executed. If they are different then, Program Block C 911 is executed. If the received packet identifier 110 is the same as the one stored, then the program purges the receive buffer and returns to the beginning of program or Program Block A 200.

Program Block C 911: The program reads the last predetermined number of bytes in the transmission, the received checksum, and removes these bytes from the input buffers and places them into a temporary buffer 912. The program generates a checksum (CRC) for the received data 913 and then compares 914 with the checksum transmitted with the data 108. If the two checksums are identical, then the data transmitted is the same as was received and the program can proceed to Program Block D 915. If the two checksums are different, then the transmitted data is different from what was received and so the program clears the receive buffer and begins again at Program Block A 902.

Program Block D 915: The program now reads the entire packet of data and removes the packet header 101, the packet identifier 102, the channel identifier 103 and the packet tail 107 leaving only the data 104. The program then writes the data 917 to the memory location specified by channel identifier 103. The program now executes program Block F 921.

Program Block E 918: The program checks to see if the received packet is identical to display instruction 106, if so instructs the computer 10 to make the selected channel of information 220 stored in the appropriate buffer 12 visible on the display unit screen 14. After the Execute display command has been executed the packet identifier is stored in memory, then computer 10 returns to Program Block A 901 and clears the input buffer 902.

Program Block F 921: After either Program Block D 921 or Program Block E 918 has been executed, the packet identifier 102 is stored in computer memory. The program then returns to the beginning and flushes the receive buffer 902.

A shown in FIG. 1B, pressing switch 15 after a data packet has been received and displayed causes the computer 10 to show the next memory buffer 12.

Although the invention has been described in detail with particular reference to these preferred embodiments, other embodiments can achieve the same results. Variations and modifications of the present invention will be obvious to those skilled in the art and it is intended to cover in the appended claims, all such modifications and equivalents. The entire disclosures of all references, applications, patents, and publications cited above, are hereby incorporated by reference.

What is claimed is:

1. A wireless libretto display apparatus using one-way communications for transmitting and remotely displaying a predetermined sequence of graphic symbols simultaneously on a plurality of displays, the apparatus comprising:
    a computer for storing said predetermined sequence of graphic symbols and for assembling said predetermined sequence of graphic symbols in a clause of symbols, said clause of symbols comprising:
        control characters and a unique identifier for said clause of symbols; and
        a first cyclical redundancy checksum generated from said clause of symbols;
    a one-way transmission means for transmitting said clause of symbols on command and for transmitting said clause of symbols at least a second time;
    a receiver means for receiving said clause of symbols, said receiver means comprising a second cyclical redundancy checksum to determine an accuracy of said clause of symbols from the first transmission or the at least second transmission, said receiver means further comprising a delay means for delaying displaying the graphic symbols on said plurality of displays for a predetermined period of time; and
    said plurality of displays for simultaneously displaying said predetermined sequence of graphic symbols only once and only if the first transmission or the at least second transmission of said clause of symbols is accurate and each display from the plurality of displays displaying a blank screen if the clause of symbols in the first transmission or at least second transmission to said each display is inaccurate.

2. The invention of claim 1 wherein said receiver means and said display means comprise a single display unit.

3. The invention of claim 2 wherein said single display unit comprises a portable unit.

4. The invention of claim 1 wherein said receiver means and said display means further comprise a rechargeable battery.

5. The invention of claim 4 wherein said receiver means further comprises a battery recharger.

6. The invention of claim 1 wherein said transmission means comprises a plurality of transmitters.

7. The invention of claim 1 wherein said predetermined sequence of graphic symbols comprises UNICODE encoding.

8. The invention of claim 1 wherein said display means comprises a plurality of displays.

9. The invention of claim 1 further comprising a plurality of wireless libretto apparatuses, each comprising a different predetermined sequence of text.

10. The invention of claim 1 further comprising a first wireless libretto display apparatus for transmitting and remotely displaying a first predetermined sequence of graphic symbols in a first location and at least a second wireless libretto display apparatus for transmitting and remotely displaying at least a second predetermined sequence of graphic symbols in at least a second location.

11. A method for transmitting and remotely displaying a predetermined sequence of graphic symbols simultaneously on a plurality of displays using one-way communications, the method comprising the steps of:
    a) storing the predetermined sequence of graphic symbols in a computer;
    b) assembling the predetermined sequence of graphic symbols in a clause of symbols, wherein the step of assembling comprises the substeps of:
        i) providing control characters and a unique identifier in each clause of symbols; and
        ii) generating a first cyclical redundancy checksum from the clause of symbols;
    c) transmitting the clause of symbols on command and transmitting the clause of symbols at least a second time with a one-way transmitter;
    d) receiving the clause of symbols with a receiver comprising a second cyclical redundancy checksum, the receiving step further comprising delaying a step of displaying the predetermined sequence of graphic symbols on the plurality of displays for a predetermined period of time;
    e) determining an accuracy of the clause of symbols by comparing the first cyclical redundancy checksum with the second cyclical redundancy checksum; and
    f) simultaneously displaying on the plurality of displays the predetermined sequence of graphic symbols only once and only if the clause of symbols is accurate and each display from the plurality of displays displaying a blank screen if the clause of symbols in the first transmission or at least second transmission to the each display is inaccurate.

12. The method of claim 11 wherein the step of determining further comprises the steps of waiting for a next clause of symbols transmission if the clause of symbols is not accurate.

13. The method of claim 11 further comprising repeating steps a) through f) for a next predetermined sequence of graphic symbols.

14. The method of claim 11 wherein the step of determining further comprises ignoring a next clause of symbols transmission if the clause of symbols is accurate.

15. The method of claim 11 further comprising encoding the predetermined sequence of graphic symbols in UNICODE.

16. A wireless infrared apparatus for remotely displaying a predetermined sequence of graphic symbols using one-way communications, the apparatus comprising:
    a micro-computer for storing said predetermined sequence of graphic symbols and for assembling said predetermined sequence of graphic symbols in a clause of symbols, said clause of symbols comprising:
        control characters and unique identifier for said clause of symbols; and;
        a first cyclical redundancy checksum generated from clause of symbols;
    an infrared one way transmission means for transmitting said clause of symbols on command and for transmitting said clause of symbols at least a second time;

an infrared receiving means for receiving said clause of symbols transmitted the first and at least the second time and also comprising a second cyclical redundancy checksum to determine accuracy of said clause of symbols, said receiving means further comprising a delay means for delaying displaying the predetermined sequence of graphic symbols on a display for a predetermined period of time; and the display for displaying the predetermined sequence of text if only once and only if said clause of symbols is accurate and displaying a blank screen if said clause of symbols in inaccurate.

17. The invention of claim 16 wherein said receiver means and said display means comprise a single display unit.

18. The invention of claim 17 wherein said single display unit comprises a portable unit.

19. The invention of claim 16 wherein said receiving means and said display further comprise a rechargeable battery.

20. The invention of claim 16 wherein said one-way transmission means comprises a plurality of transmitters.

21. The invention of claim 16 wherein said predetermined sequence of graphic symbols comprises UNICODE encoding.

22. A single character wireless apparatus for remotely displaying a predetermined graphic symbol using one-way communications, the apparatus comprising:

a computer for storing said predetermined graphic symbol and for assembling said predetermined graphic symbol in a clause of symbols, said clause of symbols comprising:

control characters and unique identifier for said clause of symbols; and a cyclical redundancy checksum generated from clause of symbols;

a one-way transmission means for transmitting said clause of symbols on command and for transmitting said clause of symbols at least a second time;

at least one receiver means for receiving said clause of symbols, said receiver means also comprising a cyclical redundancy checksum to determine accuracy of said clause of symbols transmitted a first and at least a second time, said at least one receiver means further comprising a delay means for delaying displaying the predetermined graphic symbol on a least one display means for a predetermined period of time; and the at least one display means for displaying said predetermined graphic symbol only once and only if said clause of symbols is accurate and displaying a blank screen if said clause of symbols in inaccurate.

23. The invention of claim 22 further comprises a plurality of single character wireless apparatuses arranged in a predetermined order.

24. The invention of claim 22 wherein said predetermined sequence of graphic symbols comprises UNICODE encoding.

* * * * *